United States Patent
Drescher et al.

(10) Patent No.: US 10,579,731 B2
(45) Date of Patent: Mar. 3, 2020

(54) HANDLING OF STRING VARIABLES WITH OPEN DOMAINS

(71) Applicant: SAP SE, Walldorf (DE)

(72) Inventors: Conrad Drescher, Mannheim (DE); Jens Krueger, Kaiserslautern (DE)

(73) Assignee: SAP SE, Walldorf (DE)

( * ) Notice: Subject to any disclaimer, the term of this patent is extended or adjusted under 35 U.S.C. 154(b) by 88 days.

(21) Appl. No.: 15/895,873

(22) Filed: Feb. 13, 2018

(65) Prior Publication Data

US 2019/0251162 A1    Aug. 15, 2019

(51) Int. Cl.
*G06F 17/27* (2006.01)
*G06F 8/40* (2018.01)

(52) U.S. Cl.
CPC ............ *G06F 17/2735* (2013.01); *G06F 8/40* (2013.01); *G06F 17/2785* (2013.01)

(58) Field of Classification Search
CPC .................................................. G06F 17/2735
USPC ......................................................... 704/10
See application file for complete search history.

(56) References Cited

U.S. PATENT DOCUMENTS

| | | | | |
|---|---|---|---|---|
| 2009/0192968 | A1* | 7/2009 | Tunstall-Pedoe | G06N 5/02 706/47 |
| 2011/0307435 | A1* | 12/2011 | Overell | G06F 17/278 706/46 |
| 2012/0185478 | A1* | 7/2012 | Topham | G06F 16/313 707/737 |
| 2013/0041921 | A1* | 2/2013 | Cooper | G06F 17/2735 707/780 |
| 2013/0326485 | A1* | 12/2013 | Ghosh | G06F 8/313 717/126 |

* cited by examiner

*Primary Examiner* — Jakieda R Jackson
(74) *Attorney, Agent, or Firm* — Mintz Levin Cohn Ferris Glovsky and Popeo, P.C.

(57) ABSTRACT

An apparatus for handling string variables with open domains is provided. In some implementations, the apparatus performs operations including retrieving a first string variable having a first domain, the first domain comprising at least one undefined string value. The operations further include retrieving a second string variable having a second domain, the second domain comprising one or more string values each assigned an integer value in a second set of integer values. The operations further include applying a constraint relating the first string variable with the second string variable. The operations further include comparing the first set of integer values with the second set of integer values and filtering the first set of integer values in the first domain to a third set of integer values in the first domain. The operations further include displaying the third set of integer values for the first string variable.

20 Claims, 6 Drawing Sheets

HANDLING OF STRING VARIABLES WITH OPEN DOMAINS

TECHNICAL FIELD

The subject matter described herein relates generally to data configuration processing, and more specifically, to handling string variables with open domains in constraint-based systems.

BACKGROUND

In constraint processing, relations between variables may be defined in the form of constraints. Constraints differ from imperative programming languages in that they do not specify a step or sequence of steps to execute, but rather the properties of a solution to be found. This makes constraint processing a form of declarative programming. The constraints used in constraint processing are of various kinds: those used in constraint satisfaction problems (e.g. "A or B is true"), linear inequalities (e.g. "x≤5"), and others. Constraint processing identifying feasible solutions out of a very large set of values. As constraints are applied to the variables, a number of values are removed that have been determined to be incompatible with the other available values in the model. Constraints are usually embedded within a programming language or provided via separate software libraries.

SUMMARY

Systems, methods, and articles of manufacture, including computer program products, are provided for data management. In one aspect, there is provided a system. The system may include at least one data processor and at least one memory. The at least one memory may store instructions that result in operations when executed by the at least one data processor. The operations may include retrieving a first string variable having a first domain, the first domain comprising at least one undefined string value, the at least one undefined string value assigned to a first set of integer values in a dictionary. The operations may further include retrieving a second string variable having a second domain, the second domain comprising one or more string values each assigned an integer value in a second set of integer values of the dictionary. The operations may further include applying a constraint relating the first string variable with the second string variable. The applying may include comparing the first set of integer values with the second set of integer values and filtering the first set of integer values in the first domain to a third set of integer values in the first domain, the filtering based on the comparing, a quantity of integer values in the third set less than a quantity of integer values in the first set. The operations may further include displaying, on a user interface, the third set of integer values for the first string variable.

In another aspect, there is provided a method. The method includes retrieving a first string variable having a first domain, the first domain comprising at least one undefined string value, the at least one undefined string value assigned to a first set of integer values in a dictionary. The method may further include retrieving a second string variable having a second domain, the second domain comprising one or more string values each assigned an integer value in a second set of integer values of the dictionary. The method may further include applying a constraint relating the first string variable with the second string variable. The applying may include comparing the first set of integer values with the second set of integer values and filtering the first set of integer values in the first domain to a third set of integer values in the first domain, the filtering based on the comparing, a quantity of integer values in the third set less than a quantity of integer values in the first set. The method may further include displaying, on a user interface, the third set of integer values for the first string variable.

In another aspect, there is provided a non-transitory computer program product storing instructions which, when executed by at least one data processor, causes operations which include retrieving a first string variable having a first domain, the first domain comprising at least one undefined string value, the at least one undefined string value assigned to a first set of integer values in a dictionary. The operations may further include retrieving a second string variable having a second domain, the second domain comprising one or more string values each assigned an integer value in a second set of integer values of the dictionary. The operations may further include applying a constraint relating the first string variable with the second string variable. The applying may include comparing the first set of integer values with the second set of integer values and filtering the first set of integer values in the first domain to a third set of integer values in the first domain, the filtering based on the comparing, a quantity of integer values in the third set less than a quantity of integer values in the first set. The operations may further include displaying, on a user interface, the third set of integer values for the first string variable.

In some variations, one or more features disclosed herein including the following features may optionally be included in any feasible combination. In some aspects, the first set of integer values includes all integer values ranging from 0 to maximum integer value allowed by the dictionary. The constraint may include a text case constraint, a lexicographic comparison, a maximum length constraint, a concatenation constraint, and/or a domain constraint. In some aspects, defining the first string variable may include adding an indicator to the first string variable, the indicator indicating that the first string variable includes an undefined value. The operations may include removing the indicator when the third set of values no longer comprises the undefined value. In some implementations, applying of the constraint further includes determining whether the third set of integer values no longer includes the undefined value. In some aspects, the operations include determining whether an integer value of the first set of integer values was assigned to the undefined string value. In some implementations, comparing the first set of integer values in the first domain with the second set of integer values in the second domain includes comparing each of the first set of integer values to each of the second set of integer values. The operations may also include displaying the third set of values comprises displaying a field on the user interface configured to receive user input.

Implementations of the current subject matter may include, but are not limited to, methods consistent with the descriptions provided herein as well as articles that include a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which may include a non-transitory computer-readable or machine-readable storage medium, may include, encode, store, or the like one or more programs that cause one or more processors to perform one or more of the operations described herein. Computer implemented methods consistent with one or more implementations of the current subject matter may be implemented by one or more data processors residing in a single computing system or multiple computing systems. Such multiple computing systems may be connected and may exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
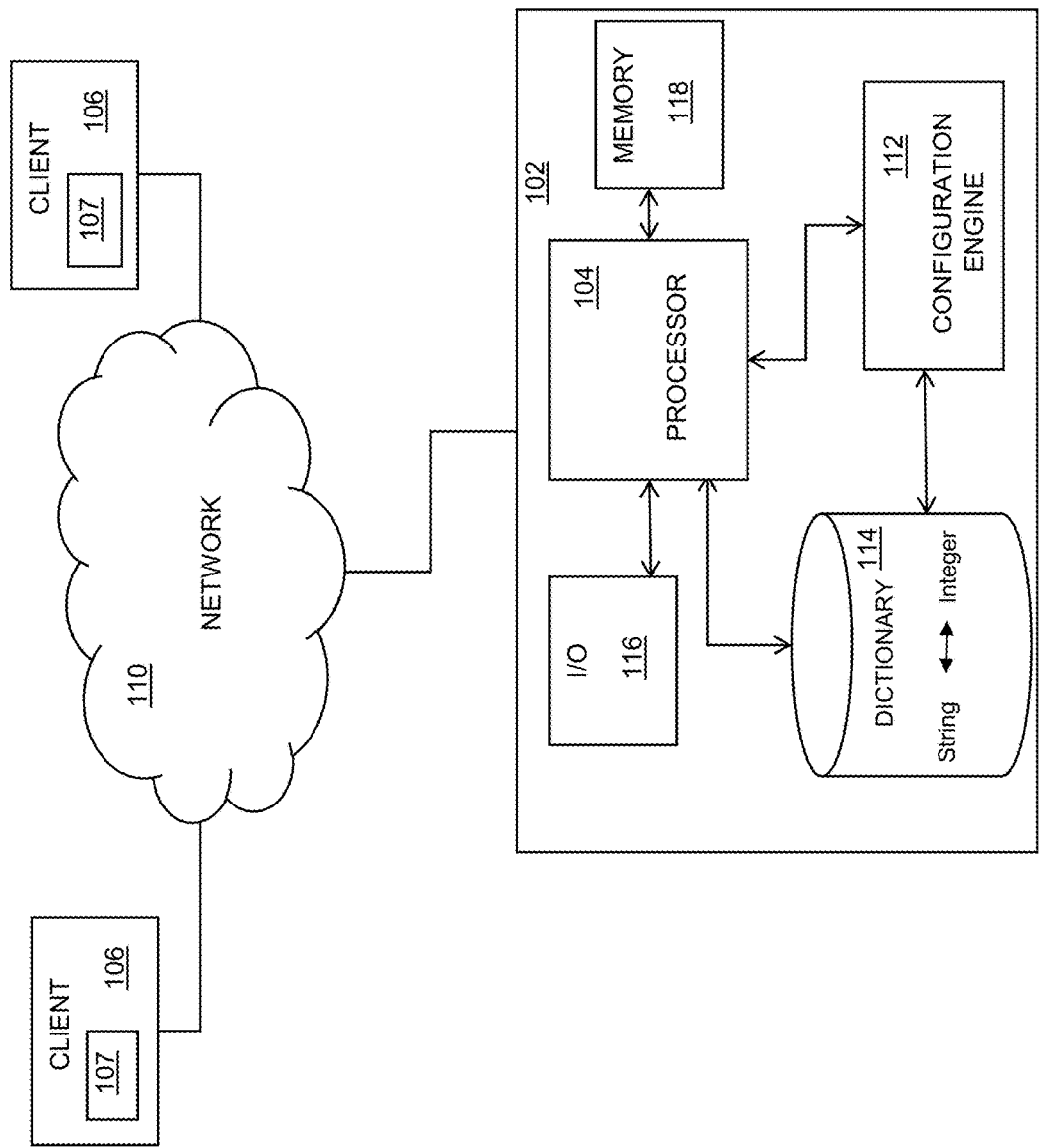
FIG. 1 depicts a diagram illustrating an interactive configuration system, in accordance with some example implementations.

Interactive data configuration utilizes data configuration models for determining which configuration options will be displayed to a user. In some aspects, the models include variables for the various data properties together with available choices per data property. The available or admissible choices may represent a variable's domain. The models may also include configuration knowledge (e.g., rules and constraints) describing which combinations of choices are admissible and which are not.

In some implementations, the variables may include string type variables which may be defined with both open and closed domains. A domain is closed if the set of admissible values for the variable is known explicitly at model load time. For example, if a user is configuring a vehicle on a user interface, a variable for an external color of the vehicle may be considered to have a closed domain if the user interface only displays three color options (e.g., red, blue, and green) for the user to select from. For a variable with an open domain, the set of admissible values may be undefined or implicitly defined by the string length, such as no more than 20 characters, a customizable string pattern, such as accepting only lowercase text and no numerical values, or some other implicit limitation, but the set of admissible values has no predefined values. A string variable with a domain that has one or more predefined values and one or more open/undefined values may be referred to as a variable with a mixed domain. String variables can be both single-valued and multi-valued. The former may be assigned a single value only, the latter may be a subset of two or more values from the variable's domain.

In conventional constraint processing, open or mixed domains could not be filtered until a value is assigned to an open domain value. Failure to filter open or mixed domains may lead to increased processing times as a constraint processor propagating the constraint rules may have to traverse domain values that are not applicable given the applied constraint rules and/or syntax. Additionally, failure to filter invalid domain values may lead to errors in constraint processing such as when invalid or inadmissible domain values are selected and later need to be changed. In developing configuration models to handle open and mixed domains, it may be difficult finding strong yet efficient filtering techniques for constraints on string variables with open and/or mixed domains.

To address these and potentially other deficiencies of currently available solutions, one or more implementations of the current subject matter relate to filtering variable values with open domains prior to assigning a concrete value to the open domain. Applying filtering to open domains may result in reducing the number of domain values processed during later constraints and/or result closing open or mixed domains prior to assigning a value to the open/mixed domain. Closing open or mixed domains may lead to identifying one or more solutions to a large number of possible outcomes prior to assigning values to the open/mixed domains which would not be possible in conventional constraint processing. In response to the processing and filtering techniques described herein, the configuration models may more efficiently filter data which may increase processing speeds and may provide improved guidance to feasible data configurations and constraint solutions.

FIG. 1 depicts a system diagram illustrating an interactive configuration system 100 comprising a computing system 102 in communication with client devices 106 over a network 110, in accordance with some implementations of the current subject matter. In some aspects, the computing system 102 may include a server in a network system. As shown in FIG. 1, the computing system includes a processor 104, a configuration engine 112, a dictionary 114, an input/output (I/O) component 116 and a memory 118.

The one or more modules, software components, or the like may be accessible to local users of the computing system 102 as well as to remote users accessing the computing system 102 from one or more client machines 106 over a network connection 110. One or more user interface screens produced by the one or more first modules may be displayed to a user, either via a local display or via a display associated with one of the client devices 106. For example, the client devices 106 may include a display 107 for displaying a user interface. In some aspects, the display 107 may display a webpage of browser application running on the client device 106. The client device 106 may be configured to receive inputs from a user performing interactive data configuration and the client device 106 may transmit inputs over the network 110 to the computing system 102.

In some aspects, the inputs from the client device 106 may be received by the I/O component 116. The I/O component 116 may include an antenna and/or transceiver configured to receive communications over the network 110. The I/O component 116 may pass the received information to the processor 104. In some aspects, the received input from the client device 106 includes a string variable value, such as a text input. The processor 104 may check the dictionary 114 to see if the received string variable value has been mapped to an integer key. If so, the processor 104 may communicate that information to the configuration engine 112 and the configuration engine 112 may process the received variable value based on the integer key.

If the string variable value has not been mapped to an integer key, the processor 104 may add the received string variable value to the dictionary 114 and map an open integer key in the dictionary 114 that has not previously been defined to the received string variable value. The processor 104 may then communicate the mapping to the configuration engine 112. The configuration engine 112 may be configured to propagate the mapping of the received string variable value to the integer key throughout the configuration model. The propagation may be based on how other variables relate to the received string variable value and/or the integer key. In some aspects, the relationship between the variable values used in the configuration model may be defined by constraint rules and/or syntax elements such as concatenation, case conversion, lexicographic comparisons, comparison for equality, any combination of the above, and/or the like.

In some implementations, the processor 104 may also analyze the received string variable value to determine whether the input is admissible/valid. This determination may be based on rules defined in the configuration model running on the configuration engine 112. If a valid string variable value is entered, the configuration engine 112 may determine, based on the configuration model, which options/results should be transmitted the user of the client device 106 based on the received string variable value and/or integer key associated with the string variable value. The options/results may be based on a relationship of the received string variable value and/or integer key with a second string variable value and/or second integer key. In some implementations, the configuration engine 112 and/or the processor may determine which options/results may be removed from a list of admissible values presented to the user based on the received variable value inputs/selections, other defined variables values, undefined variable values, such as open/mixed domain variables, and/or the like. In some aspects, the computing system 102 may then make recommendations on options a user of the client device 106 may select based on certain criteria. In some implementations, the computing system 102 may automatically add/remove certain options and/or data based on a user-inputted or machine learned selections.

It may be noted that the dictionary 114 and/or the input/output component 116 may be external in the computing system 102 despite their being shown as internal to the computing system 102 in FIG. 1. Additionally, while the components of the computing system 102 are illustrated having certain connections, the processor 104, configuration engine 112, dictionary 114, input/output (I/O) component 116, and the memory 118 may be interconnected in a variety of ways.

Figure 2:
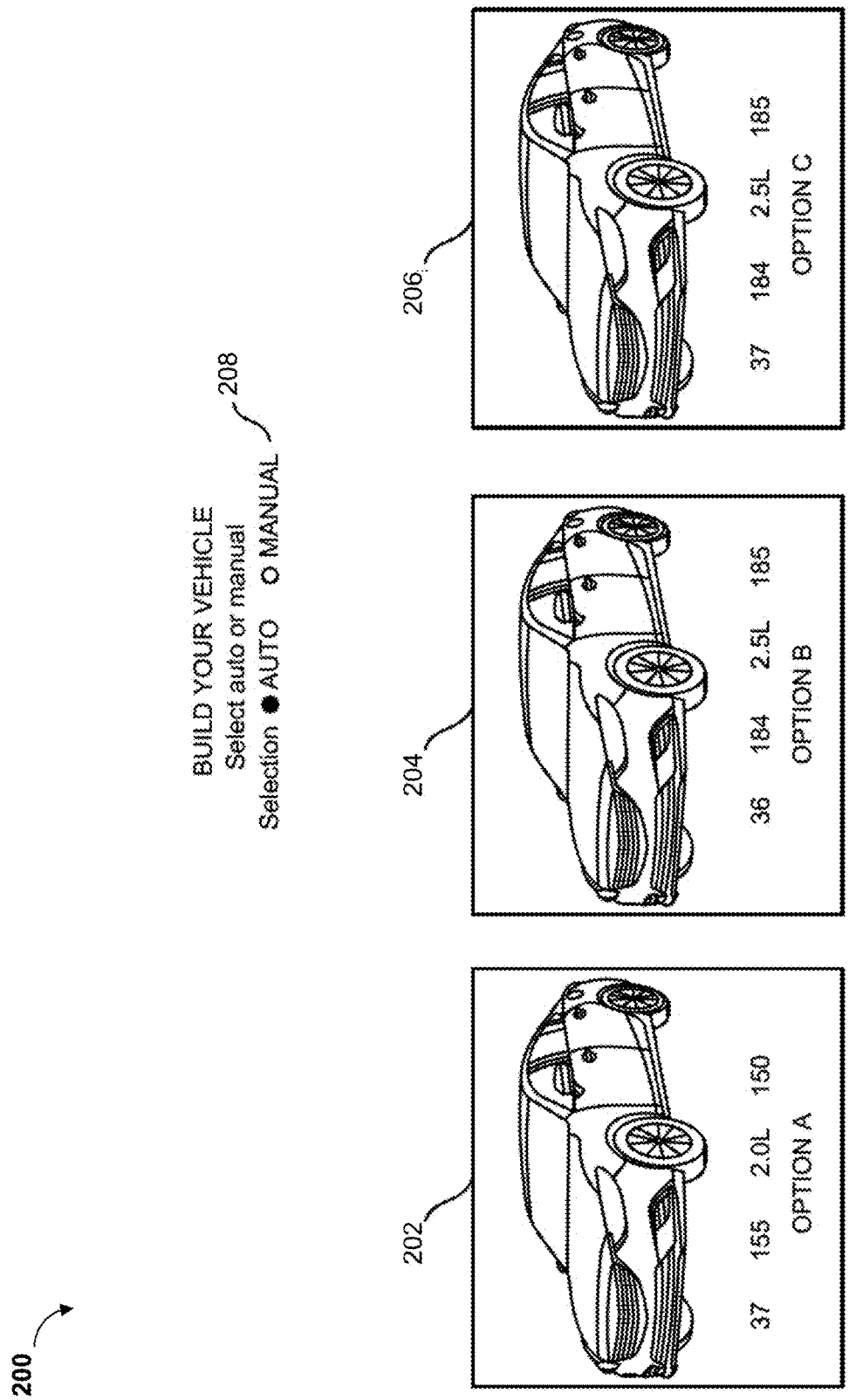
FIG. 2 depicts an example of a webpage implementing an example of a configuration model, in accordance with some implementations.

FIG. 2 depicts an example of a webpage 200 implementing an example of a configuration model, in accordance with some implementations. As shown in FIG. 2, the webpage 200 displays three trim options, such as option 202, option 204, and option 206. The webpage also has an option 208 to choose an automatic transmission or a manual transmission. A user may select one of the options 202, 204, 206 to continue the configuration process. For example, the user may select option 204 and the webpage 200 browser may then communicate that selection over the network 110 to the computing system 102 executing the configuration model. The computing system 102 may receive the communication and the processor 104 may check the dictionary 114 and retrieve the integer key associated with the string variable of the option 204. Based on the string variable value and/or the integer key, the processor 104 and/or the configuration engine 112 may generate a list of exterior and/or interior vehicles colors available for the selected vehicle trim to display to the user on the client device 106.

The list of colors displayed to a user may be based on a calculated domain of admissible values generated by the configuration engine 112, the processor 104, and/or another component of the computing device 102. The calculation may be based on a set of constraint rules relating different variables and/or their domains, the selection of the vehicle model selected previously, and/or the selection of the vehicle trim option 204. For example, the configuration model executed by the configuration engine 112 and/or the processor 104 may define three string variables: S1, S2, and S3. The domain of possible string values for S1 may be defined as "red, green, blue." Those string values may be sent to the dictionary 114 where they are mapped to integer keys 1, 2, and 3, respectively. As such, the string variable S1 may have the domain {1,2,3}.

Similarly for string variable S2, it may have predefined values "red, black." Those string values would be mapped by the dictionary 114 to the integer keys 1 and 4, respectively. Thus, string value S2 may be assigned the domain {1,4}. For string value S3, it may have a mixed domain. In some aspects, S3 has predefined values "red, black, blue", but all other strings having a length equal to or less than ten characters may also be allowed. While the sting values "red," "black," and "blue" have been assigned to the integer keys 1, 3, and 4, respectively, the configuration model may define the string variable S3 having a domain {0–maxInt} because a final set of values for S3 is undefined and cannot be mapped to an integer key, where maxInt is the maximum integer key value possible for the dictionary 114. The maximum integer may be defined by the number of bits, such as 32 bits, used to store values in the dictionary 114. In some implementations, the configuration engine 112 may add a flag or other indicator to the string variable S3 during definition indicating that it is an open/mixed domain variable. In some aspects, the configuration model, the processor 104, and/or the configuration engine 112 can query one or more variables to determine which ones of the one or more variables have open, closed, or mixed domains. The query results may be based on the flag/indicator added during the definition of the string variable.

After the above definitions for S1, S2, and S3, the dictionary 114 may include the following mapping definitions for the following integer keys: 1 assigned to red, 2 assigned to green, 3 assigned to blue, 4 assigned to black. With these definitions, the configuration model can apply constraints to the variables to remove values from the domain of the variables. For example, for a constraint S1=S2 the domains can be intersected to {1}, so both variables S1 and S2 may be assigned to value "red" without any user input.

Under previous constraint processing, the domain of S3 {0-maxInt} could not be filtered until a user assigned a value for the open variable value. Under conventional constraint processing and after the above S1=S2 constraint, if a constraint S2!=S3 (not equal) was applied, no filtering would take place and the domains for S2 and S3 would remain {1} and {0-maxInt}, respectively. However, using the constraint processing techniques described herein, the configuration model may apply the same constraint S2!=S3 which can filter S3's domain to {0, 2-maxInt} by removing integer key 1 associated with string variable value "red." The configuration model would thereby extend the usefulness of constraint processing filtering to open/mixed domains.

Figure 3:
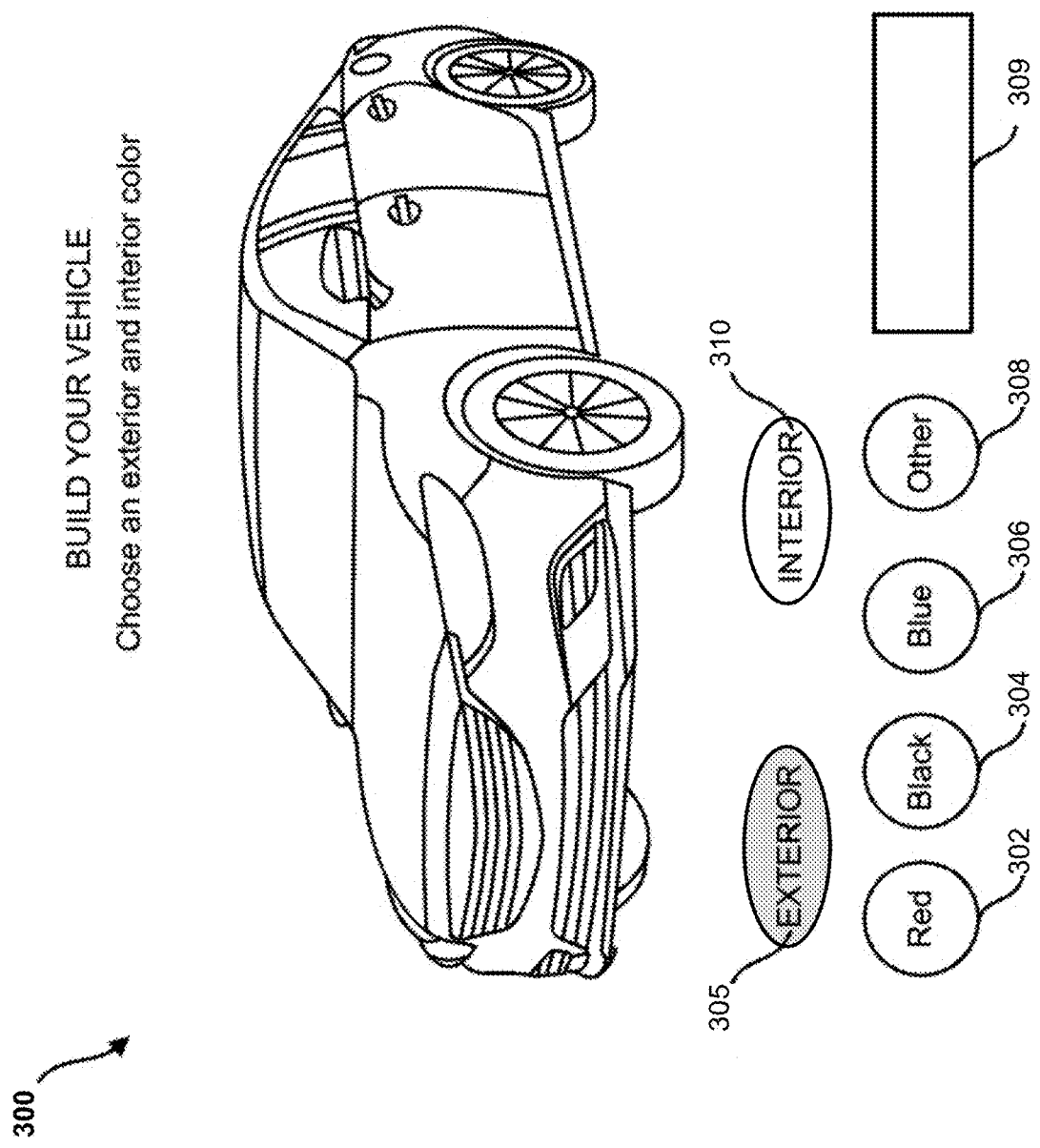
FIG. 3 depicts an example of a webpage implementing an example of a configuration model, in accordance with some implementations.

FIG. 3 depicts an example of a webpage 300 implementing an example of a configuration model, in accordance with some implementations. In some aspects, the webpage 300 is generated in response to the user selecting option 204 of webpage 200. The webpage 300 includes an option to select the exterior color 305 or the interior color 310. As shown in FIG. 3, exterior color 305 is selected and the webpage 300 presents four color options for the exterior color 305: option 302 (red); option 304 (black); option 306 (blue); and option 308 (other). In some implementations, if the user selects option 308, field 309 is displayed to the user and the user may enter in a custom color.

In some aspects, the exterior color options 302, 304, 306, and 308 of webpage 300 are based on the string variable S3 described above with a mixed domain. As shown in FIG. 3, the configuration model has not applied any constraints to the string variable S3 and the configuration model has accordingly displayed the color options defined by S3, such as red, black, blue, and another variable value that the user can enter using the field 309.

Figure 4:
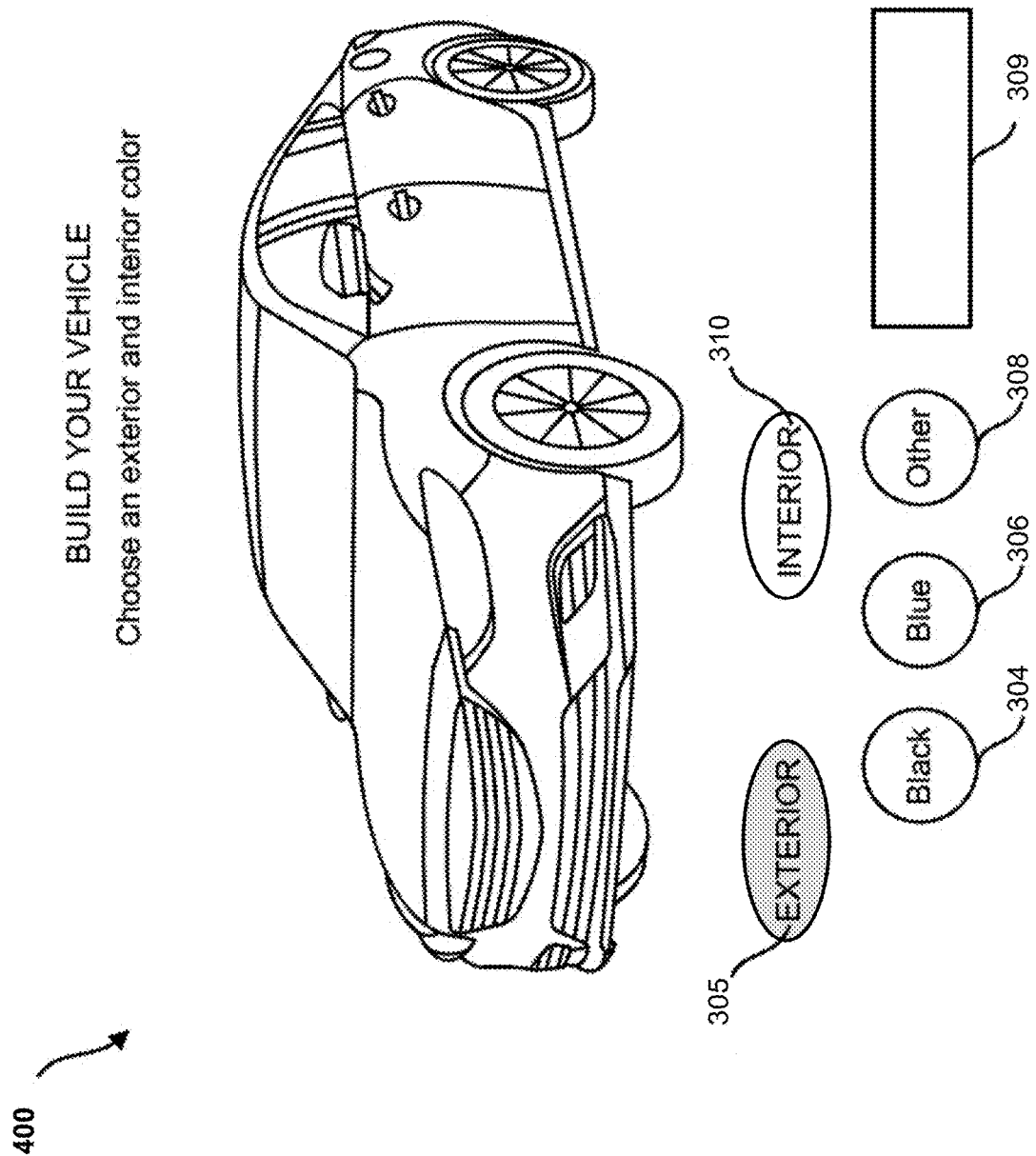
FIG. 4 depicts an example of a webpage implementing an example of a configuration model, in accordance with some implementations.

FIG. 4 depicts an example of a webpage 400 implementing an example of a configuration model, in accordance with some implementations. As shown in FIG. 4, the configuration model has applied the constraints S1=S2 and S2!=S3. As a result of the applied constraints, the domains for the respective string variable are: S1 and S2 have a domain of {1} and S3 has the domain {0, 2-maxInt}. Since S3 is a mixed domain, it was previously defined with string values "red," "black," and "blue." However, since the value "red" and integer key 1 has been removed from the domain of S3, the configuration model has accordingly displayed the color options defined by S3 after the constraints. As shown, the webpage 400 displays color option 304 (black), option 306 (blue), and option 308 (other) for which the user can enter a value using the field 309. By applying the above described filtering, option 302 (red) for the exterior color has been removed.

If the user of webpage 400 enters a string value "violet" into field 309, that string value may be sent to the dictionary 114 be assigned an integer key domain {5} and the dictionary 114 may be extended by an entry of 5 assigned to violet which was previously not defined in the model. S3 would now have a closed domain assigned to integer key 5 and further constraint processing may be applied to further configurations of the vehicle. For example, the options for the interior color 310 may be based on the selection of the exterior color 305.

The filtering techniques described herein can also beneficially turn open domains into closed domains which can help reduce or eliminate the need to process variables with open domains. For example, if a constraint S1=S3 is applied, the domains intersect at integer values {1, 3}, so both variables S1 and S3 may be assigned to values "red" and "blue" without any user input such as using field 309. Accordingly, the configuration model configured to display the domain of S3 would display only color options 302 (red) and option 306 (blue) on a webpage to a user. Such conversion from open domains to closed domains may reduce errors created by users entering invalid or inadmissible values for open domains, such as values entered into field 309. The conversion can also more quickly lead to a configuration end solution faster by eliminating user input.

While the constraints described herein relate to equal/not equal syntax elements. The filtering of open and mixed domain variables may also apply to: uppercase/lowercase constraints, lexicographic comparisons (>,<,>=,<=); simple regular expressions ([0-9]|[a-z]); maximum/minimum length constraints; concatenation constraints; domain constraints; and/or the like. In some implementations, to apply open and mixed domain filtering to these and other syntax elements, the configuration model can be configured to apply a set of rules specific to variables with open or mixed domains. In some aspects, the set of rules can close open domains, or otherwise reduce the number of admissible values for open/mixed domains, when applied.

Figure 5:
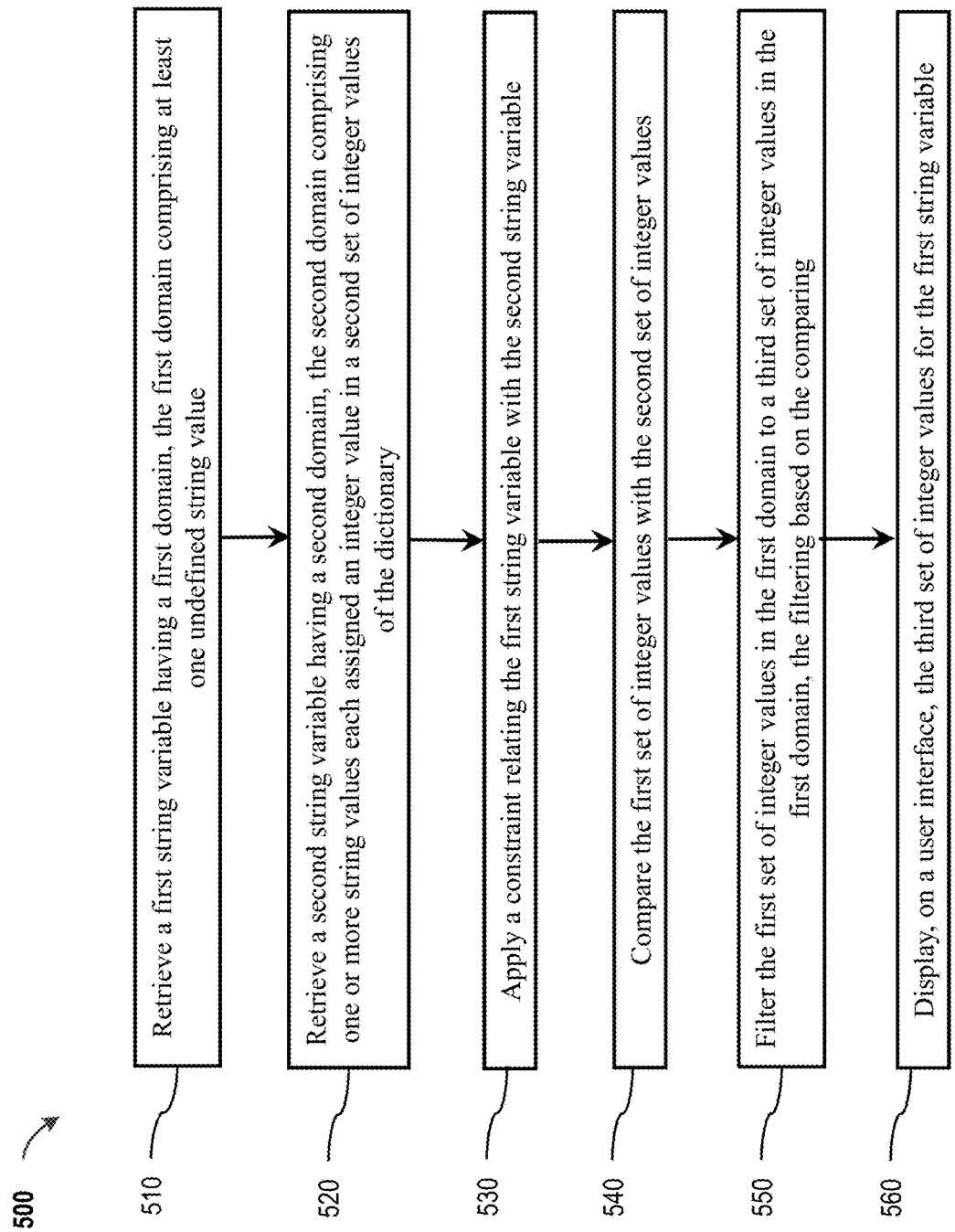
FIG. 5 depicts a flowchart illustrating a process for handling string variables with open domains, in accordance with some example implementations.
Figure 6:
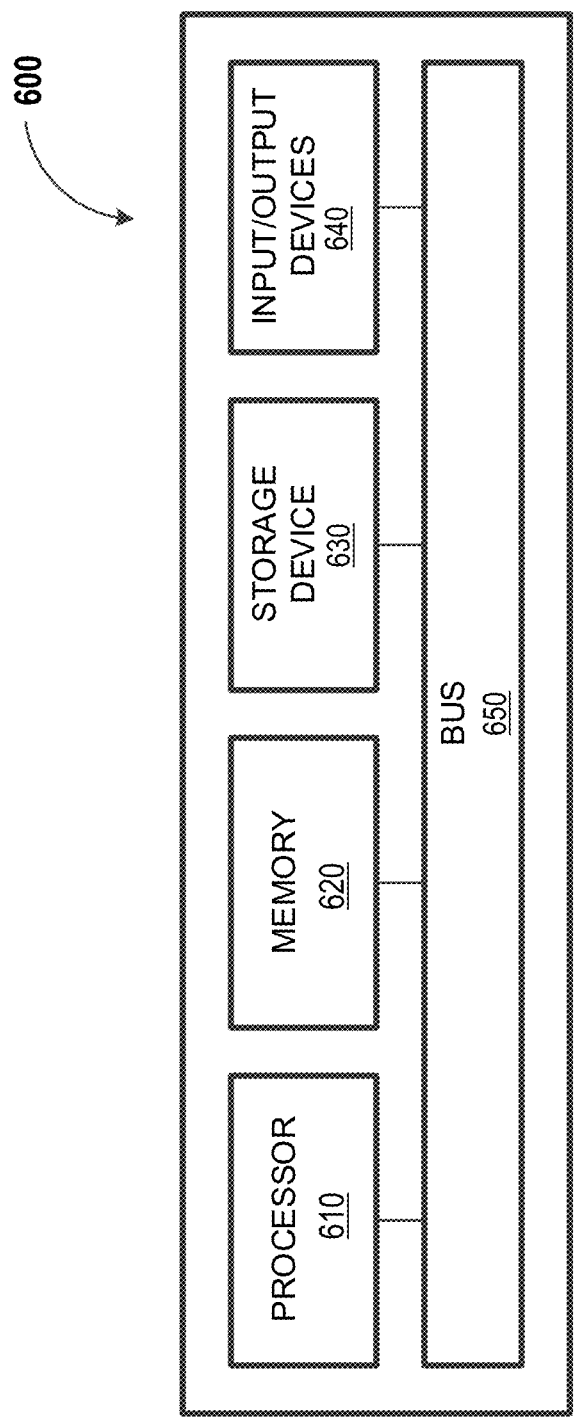
FIG. 6 depicts a block diagram illustrating a computing system, in accordance with some example implementations.

FIG. 5 depicts a flowchart illustrating a process 500 for processing string variables with open domains. Referring to FIGS. 1 and 6, the process 500 may be performed by a computing apparatus such as, for example, the computing system 102, the client device 106, and/or the computing apparatus 600.

At operational block 510, the apparatus 600, for example, may retrieve a first string variable having a first domain, the first domain including at least one undefined string value. In some aspects, the at least one undefined string value is assigned to a first set of integer values in a dictionary. At operational block 520, the apparatus 600, for example, may retrieve a second string variable having a second domain, the second domain may include one or more string values each assigned an integer value in a second set of integer values of the dictionary. At operational block 530, the apparatus 600, for example, may apply a constraint relating the first string variable with the second string variable. At operational block 540, the apparatus 600, for example, may compare the first set of integer values with the second set of integer values. At operational block 550, the apparatus 600, for example, may filter the first set of integer values in the first domain to a third set of integer values in the first domain. In some aspects, the filtering may be based on the comparing. In some aspects, a quantity of integer values in the third set is less than a quantity of integer values in the first set. At operational block 560, the apparatus 600, for example, may display on a user interface the third set of integer values for the first string variable.

In existing product configurators the domains of string variables with open or mixed domains could not be filtered/restricted by a constraint engine at all. Configuration knowledge was only processed once the variables with open domains were assigned. In contrast, the process 500 and the implementations described herein allow for both filtering open domains and recognizing when an open domain turns into a closed one, which allows more efficient filtering. This may result in a better user guidance towards actually feasible configurations.

FIG. 6 depicts a block diagram illustrating a computing apparatus 600 consistent with implementations of the current subject matter. Referring to FIG. 1, the computing apparatus 600 may be used to implement the computing system 102, the client device 106, and/or the process 500.

As shown in FIG. 6, the computing apparatus 600 may include a processor 610, a memory 620, a storage device 630, and input/output devices 640. The processor 610, the memory 620, the storage device 630, and the input/output devices 640 may be interconnected via a system bus 650. The processor 610 is capable of processing instructions for execution within the computing apparatus 600. Such executed instructions may implement one or more components of, for example, the computing system 102, the client device 106, the configuration engine 112. In some example implementations, the processor 610 may be a single-threaded processor. Alternately, the processor 610 may be a multi-threaded processor. The processor 610 is capable of processing instructions stored in the memory 620 and/or on the storage device 630 to display graphical information for a user interface provided via the input/output device 640.

The memory 620 is a computer readable medium such as volatile or non-volatile that stores information within the computing apparatus 600. The memory 620 may store data structures representing configuration object databases, for example. The storage device 630 is capable of providing persistent storage for the computing apparatus 600. The storage device 630 may be a floppy disk device, a hard disk device, an optical disk device, or a tape device, or other suitable persistent storage means. The input/output device 640 provides input/output operations for the computing apparatus 600. In some example implementations, the input/output device 640 includes a keyboard and/or pointing device. In various implementations, the input/output device 640 includes a display unit for displaying graphical user interfaces.

According to some example implementations, the input/output device 640 may provide input/output operations for a network device. For example, the input/output device 640 may include Ethernet ports or other networking ports to communicate with one or more wired and/or wireless networks (e.g., a local area network (LAN), a wide area network (WAN), the Internet).

In some example implementations, the computing apparatus 600 may be used to execute various interactive computer software applications that may be used for organization, analysis and/or storage of data in various formats. Alternatively, the computing apparatus 600 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities or may be standalone computing products and/or functionalities. Upon activation within the applications, the functionalities may be used to generate the user interface provided via the input/output device 640. The user interface may be generated and presented to a user by the computing apparatus 600 (e.g., on a computer screen monitor, etc.).

While some computer language syntax are described herein (e.g., Gecode, MiniModel), the examples and implementations described herein may equally apply to different software/computer languages and syntax.

One or more aspects or features of the subject matter described herein may be realized in digital electronic circuitry, integrated circuitry, specially designed ASICs, field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example, as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An apparatus, comprising:
at least one processor; and
at least one memory storing instructions which, when executed by the at least one processor, result in operations comprising:
retrieving a first string variable having a first domain, the first domain comprising at least one undefined string value, the at least one undefined string value assigned to a first set of integer values in a dictionary;
retrieving a second string variable having a second domain, the second domain comprising one or more string values each assigned an integer value in a second set of integer values of the dictionary;
applying a constraint relating the first string variable with the second string variable, wherein the applying of the constraint comprises
comparing the first set of integer values with the second set of integer values,
filtering the first set of integer values in the first domain to a third set of integer values in the first domain, the filtering based on a configuration model and the comparing, a quantity of integer values in the third set less than a quantity of integer values in the first set, the configuration model configured to apply a set of rules specific to the first string variable, and
transmitting, to a client device and based on the retrieved first string variable, the third set of integer values; and
displaying, on a user interface of the client device, the third set of integer values for the first string variable.

2. The apparatus of claim 1, wherein the first set of integer values comprises all integer values ranging from 0 to maximum integer value allowed by the dictionary.

3. The apparatus of claim 1, wherein the constraint comprises a text case constraint, a lexicographic comparison, a maximum length constraint, a concatenation constraint, and/or a domain constraint.

4. The apparatus of claim 1, wherein defining the first string variable comprises adding an indicator to the first string variable, the indicator indicating that the first string variable comprises an undefined value.

5. The apparatus of claim 4, wherein the operations further comprise removing the indicator when the third set of values no longer comprises the undefined value.

6. The apparatus of claim 1, wherein applying of the constraint further comprises determining whether the third set of integer values no longer comprises the undefined value.

7. The apparatus of claim 6, wherein the determining comprises determining whether an integer value of the first set of integer values was assigned to the undefined string value.

8. The apparatus of claim 1, wherein comparing the first set of integer values in the first domain with the second set of integer values in the second domain comprises comparing each of the first set of integer values to each of the second set of integer values.

9. The apparatus of claim 1, wherein displaying the third set of values comprises displaying a field on the user interface configured to receive user input.

10. The apparatus of claim 1, wherein the operations further comprise:
receiving, in response to the displaying, an input string value on the user interface, the input string value defining the undefined string value in the first domain; and
assigning the input string value to an integer in a dictionary.

11. A method comprising:
retrieving, by at least one processor, a first string variable having a first domain, the first domain comprising at least one undefined string value, the at least one undefined string value assigned to a first set of integer values in a dictionary;
retrieving, by the at least one processor, a second string variable having a second domain, the second domain comprising one or more string values each assigned an integer value in a second set of integer values of the dictionary;
applying, by the at least one processor, a constraint relating the first string variable with the second string variable, wherein the applying of the constraint comprises
comparing the first set of integer values with the second set of integer values,
filtering the first set of integer values in the first domain to a third set of integer values in the first domain, the filtering based on a configuration model and the comparing, a quantity of integer values in the third set less than a quantity of integer values in the first set, the configuration model configured to apply a set of rules specific to the first string variable, and
transmitting, to a client device and based on the retrieved first string variable, the third set of integer values; and displaying, by the at least one processor on a user interface of the client device, the third set of integer values for the first string variable.

12. The method of claim 11, wherein the first set of integer values comprises all integer values ranging from 0 to maximum integer value allowed by the dictionary.

13. The method of claim 11, wherein defining the first string variable comprises adding an indicator to the first string variable, the indicator indicating that the first string variable comprises an undefined value.

14. The method of claim 11, wherein the comparing comprises training a word embedding model and converting the first textual data to a first vector and the second textual data to a second vector using the trained word embedding model.

15. The method of claim 14, further comprising removing the indicator when the third set of values no longer comprises the undefined value.

16. The method of claim 11, wherein applying of the constraint further comprises determining whether the third set of integer values no longer comprises the undefined value.

17. The method of claim 16, wherein the determining comprises determining whether an integer value of the first set of integer values was assigned to the undefined string value.

18. The method of claim 11, wherein displaying the third set of values comprises displaying a field on the user interface configured to receive user input.

19. The method of claim 11, wherein comparing the first set of integer values in the first domain with the second set of integer values in the second domain comprises comparing each of the first set of integer values to each of the second set of integer values.

20. A non-transitory computer program product storing instructions which, when executed by at least one data processor, causes operations comprising:
    retrieving a first string variable having a first domain, the first domain comprising at least one undefined string value, the at least one undefined string value assigned to a first set of integer values in a dictionary;
    retrieving a second string variable having a second domain, the second domain comprising one or more string values each assigned an integer value in a second set of integer values of the dictionary;
    applying a constraint relating the first string variable with the second string variable, wherein the applying of the constraint comprises
        comparing the first set of integer values with the second set of integer values,
        filtering the first set of integer values in the first domain to a third set of integer values in the first domain, the filtering based on a configuration model and the comparing, a quantity of integer values in the third set less than a quantity of integer values in the first set, the configuration model configured to apply a set of rules specific to the first string variable, and
        transmitting, to a client device and based on the retrieved first string variable, the third set of integer values; and
    displaying, on a user interface of the client device, the third set of integer values for the first string variable.

* * * * *